(12) United States Patent
Kajiki et al.

(10) Patent No.: US 9,304,195 B2
(45) Date of Patent: Apr. 5, 2016

(54) OBJECT DETECTION APPARATUS AND METHOD

(71) Applicant: FUJITSU LIMITED, Kawasaki-shi, Kanagawa (JP)

(72) Inventors: Junko Kajiki, Kawasaki (JP); Tomonori Ikeya, Sagmihara (JP); Mitsuru Ochi, Kawasaki (JP); Kazuhiko Shite, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 282 days.

(21) Appl. No.: 14/064,797

(22) Filed: Oct. 28, 2013

(65) Prior Publication Data
US 2014/0132441 A1 May 15, 2014

(30) Foreign Application Priority Data
Nov. 12, 2012 (JP) .................................. 2012-248795

(51) Int. Cl.
*G01S 13/06* (2006.01)
*G01S 13/72* (2006.01)
*G01S 13/91* (2006.01)

(52) U.S. Cl.
CPC ............... *G01S 13/06* (2013.01); *G01S 13/726* (2013.01); *G01S 13/91* (2013.01)

(58) Field of Classification Search
CPC ........ G01S 13/06; G01S 13/726; G01S 13/91
USPC ..................... 342/27, 141, 145–147, 195–196
See application file for complete search history.

(56) References Cited

U.S. PATENT DOCUMENTS

| 5,461,357 A | 10/1995 | Yoshioka et al. |
| 2008/0122683 A1* | 5/2008 | Howley .................... G01S 3/04 342/149 |
| 2011/0084870 A1 | 4/2011 | Kondo et al. |

(Continued)

FOREIGN PATENT DOCUMENTS

| EP | 2565671 A1 * | 3/2013 | ............ G01S 13/536 |
| EP | 2730944 A1 * | 5/2014 | .............. G01S 13/06 |

(Continued)

OTHER PUBLICATIONS

Korean Office Action dated Dec. 19, 2014 in Korean Patent Application No. 10-2013-0136197.

(Continued)

*Primary Examiner* — John B Sotomayor
(74) *Attorney, Agent, or Firm* — Staas & Halsey LLP

(57) ABSTRACT

An object detection method includes outputting a radio wave, receiving a reflected wave of the radio wave, generating a plurality of object information each indicating a location of each of a plurality of objects with respect to a predetermined reference point based on the radio wave and the reflected wave, calculating a first distance between an observation reference line which represents a shape and a location of a target area for detection preset depending on a target object for detection, and each of the plurality of objects, based on the observation reference line information stored in advance indicating a shape and a location of the observation reference line and the object information, selecting a predetermined number or less of the object information in ascending order of the first distance among the plurality of the object information as the object information to be output, and outputting the selected object information.

12 Claims, 22 Drawing Sheets

| | |
|---|---|
| DISTANCE P(1) BETWEEN RADAR AND OBSERVATION REFERENCE LINE | P1 |
| ANGLE θ(1) BETWEEN CENTRAL ORIENTATION OF THE RADAR AND OBSERVATION REFERENCE LINE | θ1 |
| START DISTANCE OF THE OBSERVATION REFERENCE LINE dsp(1) | dsp1 |
| START ANGLE OF THE OBSERVATION REFERENCE LINE αsp(1) | αsp1 |
| FINISH DISTANCE OF THE OBSERVATION REFERENCE LINE dfp(1) | dpf1 |
| FINISH ANGLE OF THE OBSERVATION REFERENCE LINE αfp(1) | αfp1 |
| ⋮ | ⋮ |
| DISTANCE P(n) BETWEEN RADAR AND OBSERVATION REFERENCE LINE | Pn |
| ANGLE θ(n) BETWEEN CENTRAL ORIENTATION OF THE RADAR AND OBSERVATION REFERENCE LINE | θn |
| START DISTANCE OF THE OBSERVATION REFERENCE LINE dsp(n) | dspn |
| START ANGLE OF THE OBSERVATION REFERENCE LINE αsp(n) | αspn |
| FINISH DISTANCE OF THE OBSERVATION REFERENCE LINE dfp(n) | dpfn |
| FINISH ANGLE OF THE OBSERVATION REFERENCE LINE αfp(n) | αfpn |

(56) References Cited

U.S. PATENT DOCUMENTS

| | | |
|---|---|---|
| 2011/0299734 A1 | 12/2011 | Bodenmueller |
| 2013/0218398 A1* | 8/2013 | Gandhi ................... B60R 16/02 701/31.1 |
| 2014/0266855 A1* | 9/2014 | Ikeya .................... G01S 13/931 342/27 |
| 2015/0204973 A1* | 7/2015 | Nohara ................. G01S 13/426 342/107 |

FOREIGN PATENT DOCUMENTS

| | | |
|---|---|---|
| JP | 2006-163879 | 6/2006 |
| WO | WO2011/023244 | 3/2011 |

OTHER PUBLICATIONS

Extended European Search Report dated Mar. 4, 2014 in European Patent Application No. 13190665.3.

* cited by examiner

FIG. 8

| | | |
|---|---|---|
| | 82 | 84 |
| | DISTANCE P BETWEEN RADAR AND OBSERVATION REFERENCE LINE | P1 |
| | ANGLE θ BETWEEN CENTRAL ORIENTATION OF THE RADAR AND OBSERVATION REFERENCE LINE | θ1 |

| | | | | | | |
|---|---|---|---|---|---|---|
| DISTANCE d | d3 | d1 | ... | dm | d6 |
| VELOCITY v | v3 | v1 | ... | vm | v6 |
| ANGLE α | α3 | α1 | ... | αm | α6 |
| RECEPTION POWER e | e3 | e1 | ... | em | e6 | ms OBJECT

FIG. 13

| | | 140 |
|---|---|---|

| 142 | 144 |
|---|---|
| DISTANCE P(1) BETWEEN RADAR AND OBSERVATION REFERENCE LINE | P1 |
| ANGLE $\theta(1)$ BETWEEN CENTRAL ORIENTATION OF THE RADAR AND OBSERVATION REFERENCE LINE | $\theta 1$ |
| ⋮ | ⋮ |
| DISTANCE P(n) BETWEEN RADAR AND OBSERVATION REFERENCE LINE | Pn |
| ANGLE $\theta(n)$ BETWEEN CENTRAL ORIENTATION OF THE RADAR AND OBSERVATION REFERENCE LINE | $\theta n$ |

FIG. 20

| | |
|---|---|
| DISTANCE P(1) BETWEEN RADAR AND OBSERVATION REFERENCE LINE | P1 |
| ANGLE $\theta(1)$ BETWEEN CENTRAL ORIENTATION OF THE RADAR AND OBSERVATION REFERENCE LINE | $\theta 1$ |
| START DISTANCE OF THE OBSERVATION REFERENCE LINE dsp(1) | dsp1 |
| START ANGLE OF THE OBSERVATION REFERENCE LINE $\alpha$sp(1) | $\alpha$sp1 |
| FINISH DISTANCE OF THE OBSERVATION REFERENCE LINE dfp(1) | dpf1 |
| FINISH ANGLE OF THE OBSERVATION REFERENCE LINE $\alpha$fp(1) | $\alpha$fp1 |
| ⋮ | ⋮ |
| DISTANCE P(n) BETWEEN RADAR AND OBSERVATION REFERENCE LINE | Pn |
| ANGLE $\theta(n)$ BETWEEN CENTRAL ORIENTATION OF THE RADAR AND OBSERVATION REFERENCE LINE | $\theta n$ |
| START DISTANCE OF THE OBSERVATION REFERENCE LINE dsp(n) | dspn |
| START ANGLE OF THE OBSERVATION REFERENCE LINE $\alpha$sp(n) | $\alpha$spn |
| FINISH DISTANCE OF THE OBSERVATION REFERENCE LINE dfp(n) | dpfn |
| FINISH ANGLE OF THE OBSERVATION REFERENCE LINE $\alpha$fp(n) | $\alpha$fpn |

# OBJECT DETECTION APPARATUS AND METHOD

CROSS-REFERENCE TO RELATED APPLICATION

This application is based upon and claims the benefit of priority of the prior Japanese Patent Application No. 2012-248795 filed on Nov. 12, 2012, the entire contents of which are incorporated herein by reference.

FIELD

The embodiments discussed herein are related to an object detection apparatus and a method thereof.

BACKGROUND

An object detection apparatus that utilizes a radio wave such as a millimeter wave radar as a means for detecting the existence of a vehicle on a road may be used in order to, for example, grasp a traffic volume or ensure a traffic safety of the road. In such an object detection apparatus, it is generally difficult to output all of the processed data due to the limitation of communication capacity of a data output unit. Accordingly, data determined to be more useful need to be output first.

As for a vehicle-mounted object detection apparatus, an image processing apparatus has been known in which targets are selected and processed sequentially from a target nearest to an estimated route of an own vehicle predicted from the traveling state of the own vehicle or sequentially from a target nearest to the own vehicle as images having higher priorities in radar search results for an area located in front of the own vehicle. In this case, the radar mounted on the own vehicle detects an area of each object candidate (target) included in a captured image of the area located in front of the own vehicle to determine the priority of an image recognition processing. Accordingly, the image processing apparatus may select a target in a descending order of importance (degree of attention) and perform the image recognition processing on the selected target without performing the image recognition processing on images of all areas.

The image processing apparatus, when performing the image recognition processing on the target, for example, sets an image recognition range which is substantially a reversed trapezoidal shape, when viewed from the own vehicle, on a captured image and uses each area of which one half width or more is included in the image recognition range as an area which falls within the image recognition range to define only images of these areas as a target image for recognition. Accordingly, when selecting the object candidate from sequentially from a target nearest to the own vehicle located in front of the own vehicle based on the coordinate values, the object candidate which is not fallen within the image recognition range is excluded from the image recognition processing. See, for example, Japanese Laid-Open Patent Publication No. 2006-163879.

When detecting an object using a radar, many objects other than the target object for detection may be included in a detectable range. This corresponds to a case where many objects such as a road structure on a roadside are included in a short distance when detecting a vehicle on a road. It is undesirable that a vehicle detection radar selects unnecessary data such as the road structure first. However, desirable data may not be obtained in a method where the image recognition range is set as a substantially reversed trapezoidal shape when viewed from the radar (own vehicle) on the captured image and data is sorted in an ascending or a descending order of the radar output value based on the set image recognition range, for example, in a case where the radar is installed at the roadside. That is, data of, for example, the structures other than a target object for detection (e.g., a vehicle) may be frequently detected. Further, considering that the data processing capability of the radar is not so high, data may be sorted and extracted using a relatively simple processing.

SUMMARY

According to an aspect of the present disclosure, there is provided an object detection method which includes outputting a radio wave, receiving a reflected wave of the radio wave, generating a plurality of object information each indicating a location of each of a plurality of objects with respect to a predetermined reference point based on the radio wave and the reflected wave, calculating a first distance between an observation reference line which represents a shape and a location of a target area for detection preset depending on a target object for detection, and each of the plurality of objects, based on the observation reference line information stored in advance indicating a shape and a location of the observation reference line and the object information, selecting a predetermined number or less of the object information in ascending order of the first distance among the plurality of the object information as the object information to be output, and outputting the predetermined number or less of the selected object information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 8 is a view illustrating an example of observation reference line information according to the first embodiment.

FIG. 10 is a view illustrating an example of output data according to the first embodiment.

FIG. 13 is a view illustrating an example of observation reference line information according to the second embodiment.

FIG. 20 is a view illustrating an example of observation reference line information according to the third embodiment.

DESCRIPTION OF EMBODIMENTS

Figure 1:
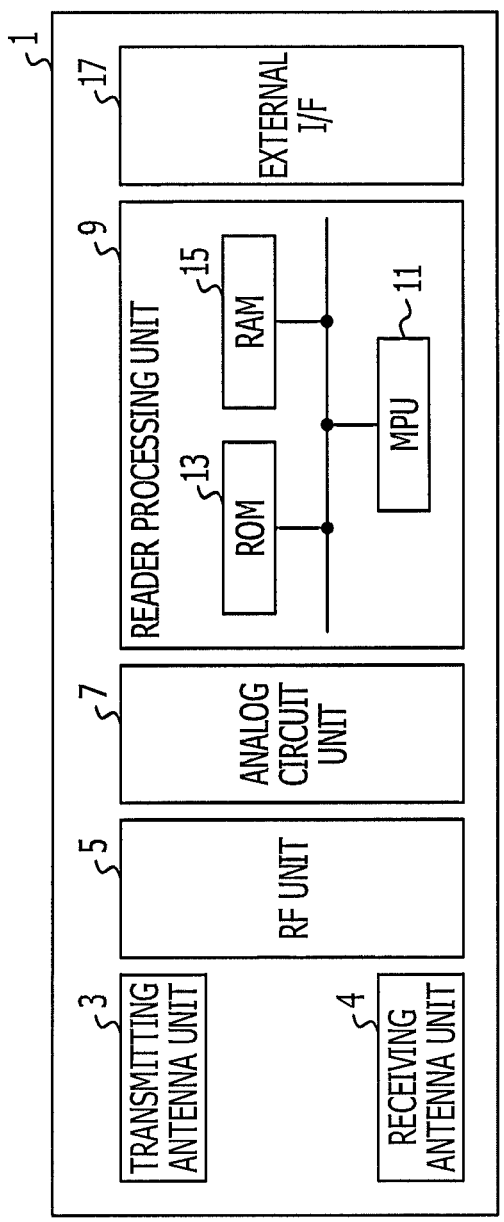
FIG. 1 is a block diagram illustrating an example of the functions of a radar according to a first embodiment.

In view of the problems described above, there is provided an object detection apparatus and a method capable of selecting and outputting desired information among the information of the detected objects with a relatively simple processing.

An object detection apparatus according to an aspect of the present disclosure includes a radio wave output unit, a radio wave receiving unit, an object information generation unit, a calculation unit, a selection unit, and an output unit. The radio wave output unit outputs the radio wave. The radio wave receiving unit receives a reflected radio wave. The object information generation unit generates a plurality of object information each indicating a location of each of a plurality of objects with respect to a predetermined reference point based on the radio wave and the reflected wave. The calculation unit calculates a first distance between each of the plurality of objects and an observation reference line representing a shape and a location of a target area for detection set in advance according to the target object for detection, based on the object information and observation reference line information indicating a shape and a location of the observation reference line stored in advance. The selection unit selects the predetermined number or less of object information arranged in ascending order of the first distance among the plurality of object information as the object information to be output. The output unit outputs the predetermined number or less of the object information selected by the selection unit.

A computer-readable recording medium according to another aspect of the present disclosure stores a computer program that, when executed, causes a computer to execute an object detection method including generating a plurality of object information which indicate a location of each of a plurality of objects with respect to a predetermined reference point based on the radio wave and the reflected wave; calculating a first distance between each of the plurality of objects and the observation reference line representing a shape and a location of a target area for detection set in advance according to the target object for detection, based on the object information and observation reference line information indicating a shape and a location of the observation reference line stored in advance; selecting the predetermined number or less of the object information arranged in ascending order of the first distance among the plurality of object information as the object information to be output; and outputting the predetermined number or less of object information selected by the selecting.

First Embodiment

Hereinafter, a configuration and operation of a radar 1 according to a first embodiment will be described with reference to the drawings. The radar 1 is an object detection apparatus which, for example, outputs millimeter wave in a preset angle of range and detects a reflected wave of the millimeter wave to detect the distance of the object from the radar 1, along with the direction and moving velocity of the object. A radar, such as for example, a scan type pulse radar or a Frequency Modulated Continuous Wave (FM-CW) radar, capable of outputting a detection result in two dimension may be adopted as the radar 1. In the present embodiment, the FM-CW radar will be described as an example. It is assumed that the radar 1 is installed in the vicinity of a road and detects a vehicle travelling on the road or an obstacle existing on the road.

FIG. 1 is a block diagram illustrating an example of functions of the radar 1. As illustrated in FIG. 1, the radar 1 includes a transmitting antenna unit 3, a receiving antenna unit 4, a radio frequency (RF) unit 55, an analog circuit unit 7, a radar processing unit 9, and an external interface (I/F) 17.

The transmitting antenna unit 3 is an antenna which transmits a radio wave for detecting an object. The receiving antenna unit 4 is an antenna which receives a reflected wave of the transmitted radio wave. The RF unit 5 is a device which generates a radio wave to be output from the transmitting antenna unit 3, and at the same time, performs a processing, such as amplifying a signal received by the receiving antenna unit 4. The transmitting antenna unit 3, the receiving antenna unit 4, the RF unit are configured such that the radio wave may be output in a preset angular range by a method, such as for example, a mechanical scanning method or a beam switching method. The analog circuit unit 7 is a device which performs a conversion between an analog signal of the transmitting antenna unit 3/the receiving antenna unit 4 and a digital signal of the radar processing unit 9.

The radar processing unit 9 is a device that performs a digital signal processing and includes a Micro Processing Unit (MPU) 11, a Read Only Memory (ROM) 13, and a Random Access Memory (RAM) 15. For example, the MPU 11 is an operational processing device which controls an operation of the radar 1. The ROM 13 is a computer-readable storage device, and a program which controls the operation of the radar 1 executed by, for example, the MPU 11 may be stored therein. The RAM 15 is a computer readable-writable storage device, and various data acquired during the program is executed by the MPU 11 can be stored therein. The external I/F 17 is an interface device that receives data transmission request from outside and outputs information such as a position or velocity of the detected object to outside.

Figure 2:
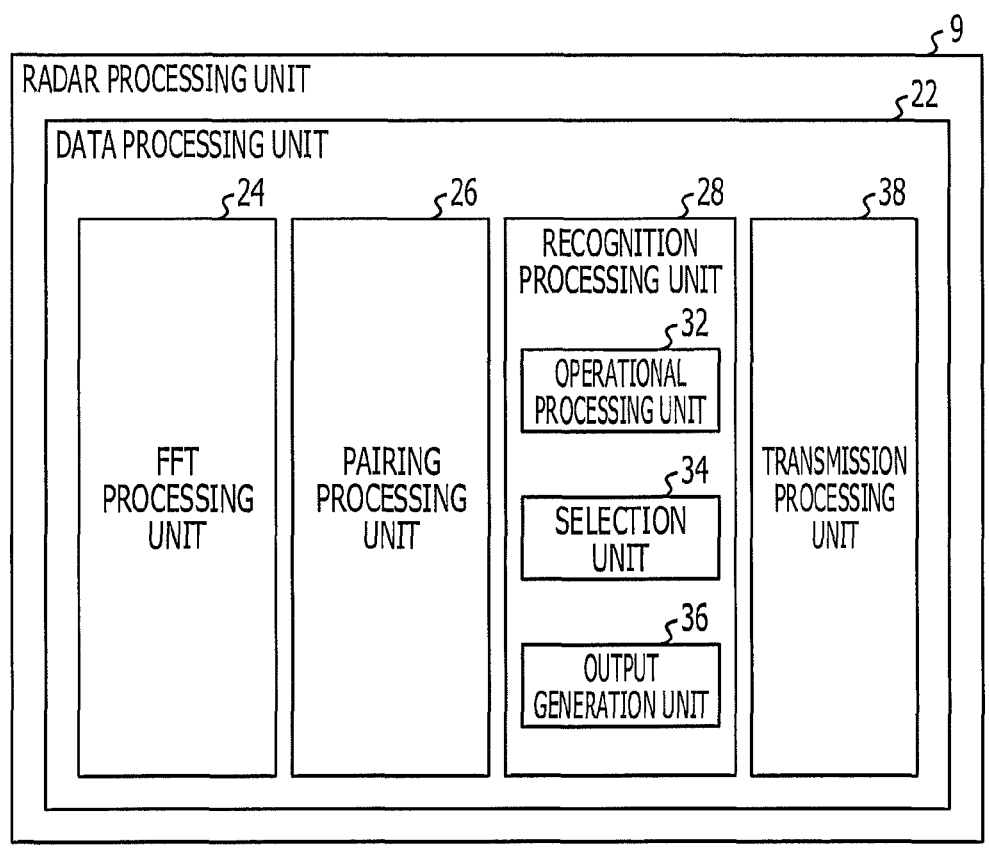
FIG. 2 is a block diagram illustrating the functions of a radar processing unit of the radar according to the first embodiment.

FIG. 2 is a block diagram illustrating the functions of a radar processing unit. The radar processing unit 9 performs a processing for a detected signal in the radar 1. As illustrated in FIG. 2, the radar processing unit 9 includes a data processing unit 22 and an external I/F unit 17. In the data processing unit 22, for example, the MPU 11 executes the program stored in the ROM 13 to process the digital data. The data processing unit 22 includes a Fast Fourier Transform (FFT) processing unit 24, a pairing processing unit 26, and a recognition processing unit 28.

The FFT processing unit 24 performs a fast Fourier transform on a received signal converted into a digital signal in the analog circuit unit 7. The pairing processing unit 26 detects an object by pairing a difference between a transmitted wave and a reflected wave in the frequency ascending section and a difference between a transmitted wave and a reflected wave in the frequency descending section based on the data obtained from the FFT processing unit 24. The pairing processing unit 26 outputs the detection result as object information indicating a location of the object. Here, it is assumed that the direction of a width center of a detection range caused by the radio wave of the radar 1 is defined as a central orientation. In this case, the object information includes an angle formed by the direction of the detected object, for example, from the center of the radar 1 (the center of size, the center of gravity, the center point of the radio wave output or the like, hereinafter simply referred to as radar 1) and the central orientation and the distance of the object from the radar 1. The object information may include a moving velocity of the object and intensity of the detected radio wave.

A recognition processing unit 28 includes a calculation unit 32, a selection unit 34, and an output generation unit 36. The recognition processing unit 28 selects and outputs a determined number of information from a plurality of object information output from the paring processing unit 26. In this case, the recognition processing unit 28 stores the observation reference line information, which indicates the shape and the location of the observation reference line which is set to represent the shape and the location of a place (hereinafter, referred to as the target area for detection) in which an object intended to be detected (also referred to as the target object for detection) is believed to exist, in, for example, a RAM, in advance. The calculation unit 32 assigns the priority to the object information based on the object information and the observation reference line information. The selection unit 34 selects the object information having a high priority among a plurality of object information. The output generation unit 36 generates data to be output based on the selected object information. Further, for example, the target area for detection refers to a road, and the target object for detection refers to a vehicle travelling on the road. The transmission processing unit 38 outputs the output data to outside based on the object information selected by the recognition processing unit 28.

Figure 3:
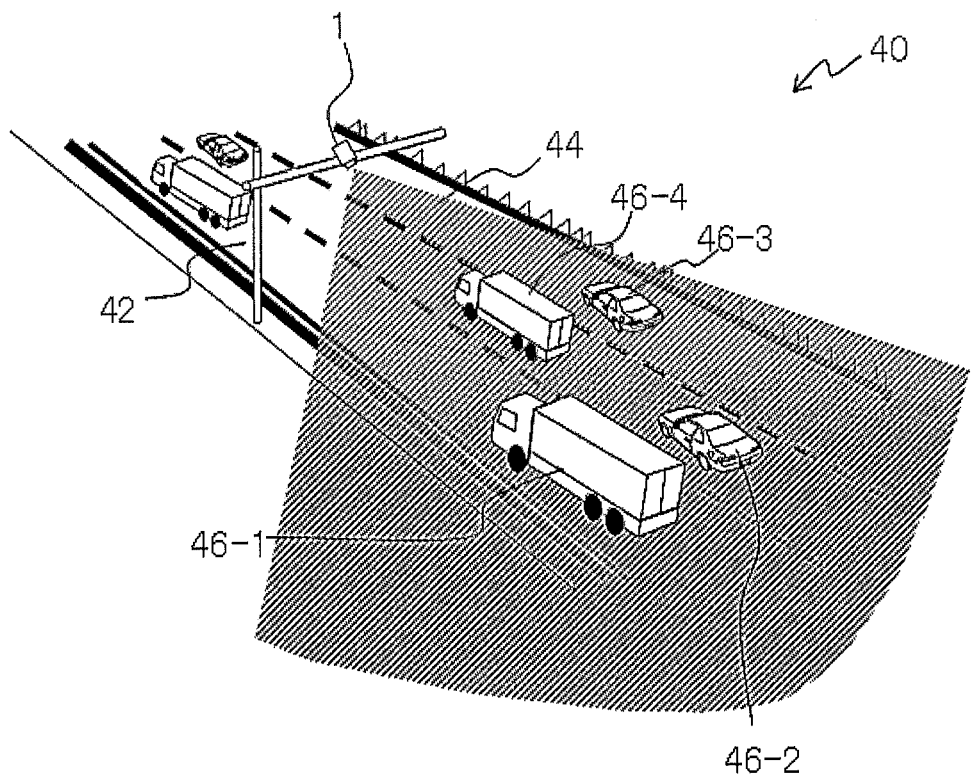
FIG. 3 is a view illustrating an installation example of the radar according to the first embodiment.

FIG. 3 is a view illustrating an installation example 40 of the radar 1. In the first embodiment, it is assumed that a road 42 corresponding to a target area for detection extends along a straight line. In the installation example 40, the radar 1 is installed at substantially above the center of the width of the road 42. In this case, a range within which the radar 1 can detect an object is referred to as a detection range, and is denoted as a detection range 44 in an example of FIG. 3. The radar 1 detects a reflected wave of the output radio wave to detect the object existing in the detection range 44. Further, in FIG. 3, the detection range 44 conceptually illustrates a range within which the radar 1 can detect an object. It is similar in other drawings described in the following description.

In the installation example 40, the radar 1 detects, for example, a distance of each of a plurality of vehicles 46-1, 46-2, 46-3, 46-4 travelling the road 42 from the radar 1, an angle formed by a direction from the radar 1 and the central orientation, and a moving velocity.

Figure 4:
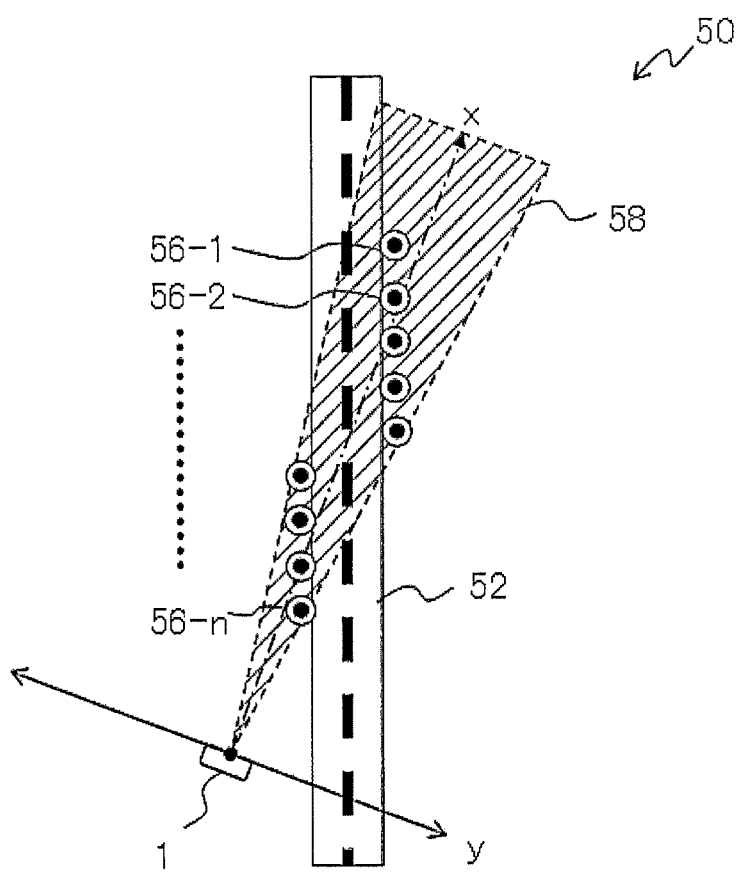
FIG. 4 is a view illustrating another installation example of the radar according to the first embodiment.

FIG. 4 is a view illustrating an installation example 50 of the radar 1. In the installation example 50, the target area for detection is a road 52 and the radar 1 is installed on the roadside of the road 52. As illustrated in FIG. 4 of the installation example 50, the direction along which the road 52 of the target area for detection extends is not in line with the central orientation of the radar 1. In such a case, the structure 56 located at the roadside, such as for example, a road sign or a protective wall denoted by, for example, the structures 56-1 to 56-n (collectively referred to as the structure 56) may be detected. However, the structure 56 is different from the target object for detection of the radar 1 in the present embodiment. Therefore, it is desirable that the structure 56 is not detected.

Figure 5:
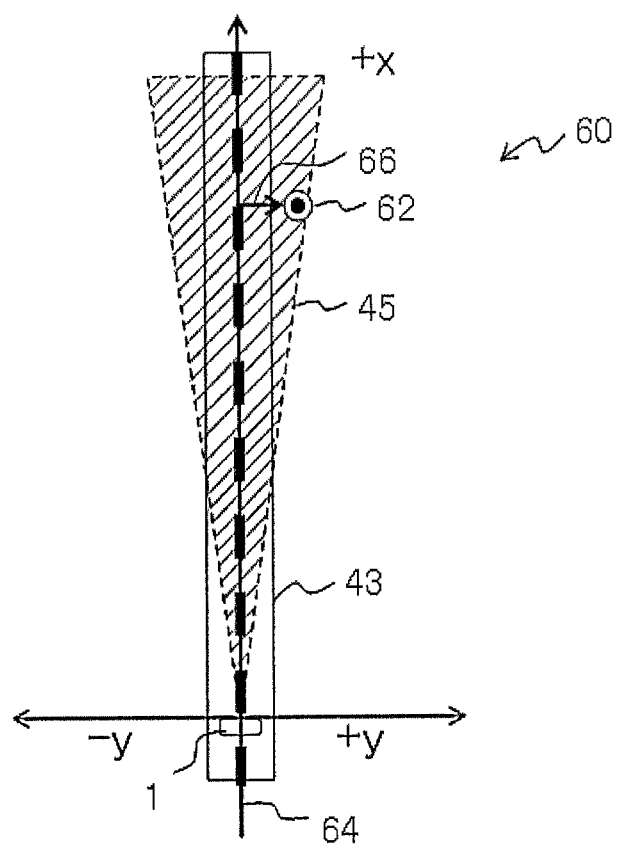
FIG. 5 is a view illustrating a detection example of an object according to the first embodiment.

FIG. 5 is a view illustrating a detection example 60 of an object in a case where the radar 1 is installed at substantially above the center of the width of a road 43, as in the installation example 40 of FIG. 3. In the detection example 60, an observation reference line 64 which represents the shape and the location of target area for detection of the radar 1 is set in order to detect the target object for detection first in a detection range 45. In the detection example 60, the road 43 is set as the target area for detection of the radar 1 in order for the radar 1 to detect an object on the road 43. The observation reference line 64 is set to indicate the shape and the location of the road 43 similarly. In the detection example 60, the observation reference line 64 is set as a single straight line passing through the center of the width direction of the road 43 along the direction of the road 43.

In this case, the radar 1 is set as an origin of the coordinates, the central orientation of the radar 1 (the up and down direction of FIG. 5) is set as X-axis, and the direction passing through the radar 1 and perpendicular to the X-axis (left and right direction of FIG. 5) is set as Y-axis. Further, in the X-axis, the direction toward which the radio wave is output is a positive direction, and in the Y-axis, the right side is set as a positive direction when viewed the X-axis from above. Further, in the example of FIG. 5, an installation direction of the radar 1 is set such that the central orientation of the installation direction is the same as the direction of the observation reference line 64. In this case, in order to detect the object such as a vehicle travelling on the road 43 determined as useful first over an object 62 existing on a place other than the road 43, the detection may be made in ascending order of a distance 66 from the observation reference line 64. That is, that the data may be sorted and output in ascending order of an absolute value of the distance 66.

Figure 6:
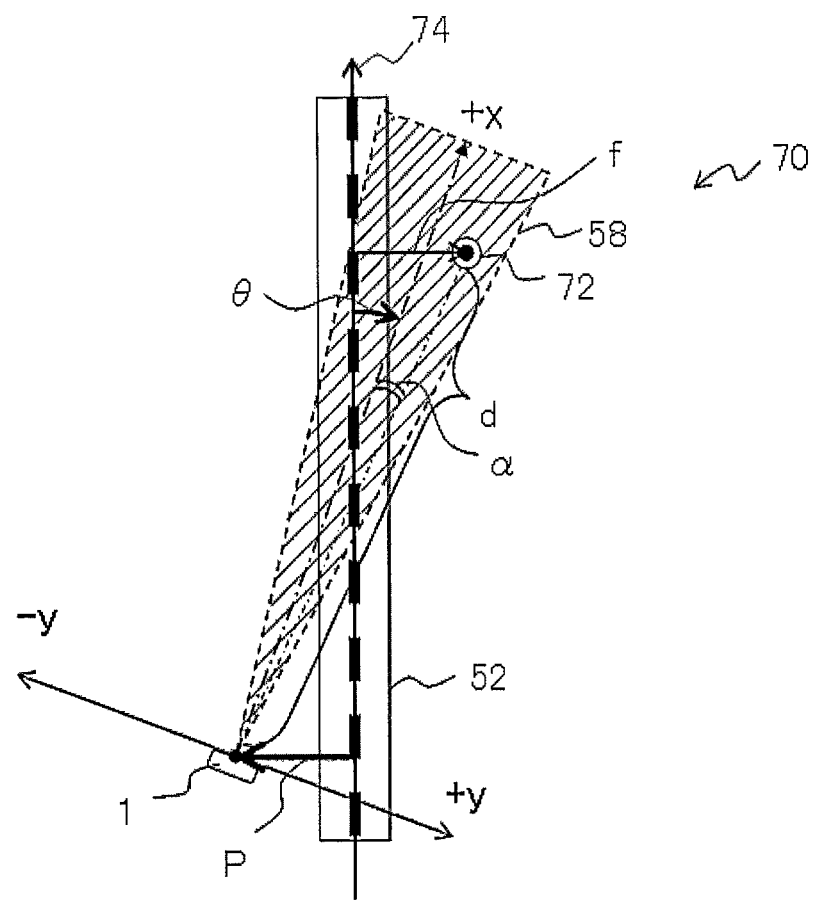
FIG. 6 is a view illustrating another detection example of an object according to the first embodiment.

FIG. 6 is a view illustrating a detection example 70 of an object in the installation example 50 of FIG. 4. In the example of FIG. 4, the radar 1 detects the object on the road 52 and thus, the target area for detection corresponds to the road 52. The observation reference line 74 is similarly set based on the shape of the road 52. In the detection example 70, the observation reference line 74 is set as a single straight line passing through the center of the width direction of the road 52 along the direction of the road 52.

In this case, as in the detection example 60, the radar 1 is set as an origin of the coordinates, the central orientation of the radar 1 is set as X-axis, and the direction perpendicular to the X-axis is set as Y-axis. In the detection example 70, since the radar 1 is installed at the roadside of the road 52, an angle θ is formed between the observation reference line 74 and the X-axis. Further, the distance between the observation reference line 74 and the radar 1 is a distance P. Further, the distance P is set as a positive in a case where the radar 1 is located at a left side with respect to the observation reference line when an installation place of the radar 1 is viewed from above. Further, the location of the object 72 is represented by the polar coordinates where the radar 1 is origin, and in an example of FIG. 6, the location of the object 72 is represented by an angle α and a distance d.

In this case, in order to detect the object on the road 52 first over other objects existing at other sites, the object on the road 52 may be detected in ascending order of the distance f from the observation reference line 74. Further, since the detection example 60 of FIG. 5 corresponds to an example where θ=0 and P=0 in a detection example 70, a processing will be described based on the detection example 70 in the following description.

Figure 7:
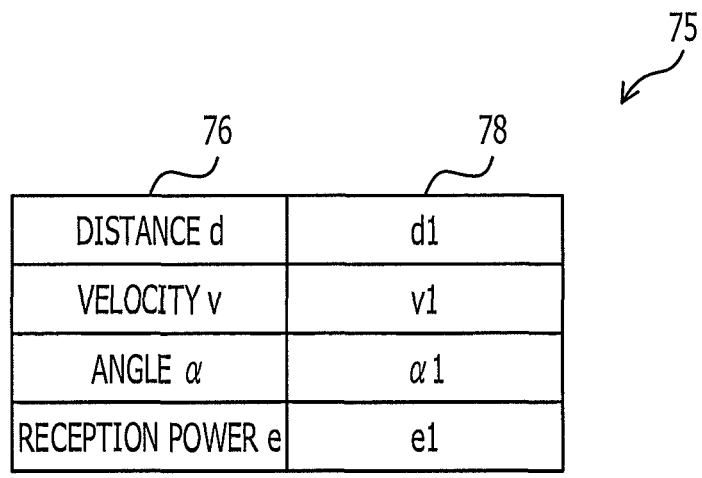
FIG. 7 is a view illustrating an example of object information according to the first embodiment.

Next, the data generated in the radar 1 according to the present embodiment will be described. FIG. 7 is a view illustrating an example of object information 75. The object information 75 is data generated in the pairing processing unit 26 and indicates a location and a state of the detected object. The object information 75 includes, as items 76, the distance d of the detected object from the radar 1, the velocity of the object v, the angle α between the detected object and the X-axis, and the reception power e. Also, a distance d1, a velocity v1, an angle α1 and a reception power e1 are indicated as measured values 78 in the object information 75. In FIG. 7, while only one set of object information 75 is illustrated, for example, more than one hundred sets of the object information 75 may be detected from the detection range 58.

FIG. 8 is a view illustrating an example of observation reference line information 80. The observation reference line information 80 indicates a location and a shape of the observation reference line. The observation reference line information 80 includes, as items 82, the distance P between the radar 1 and the observation reference line, and an angle θ between the observation reference line 74 and the central orientation of the radar 1. Also, the distance P1 and the angle θ1 are indicated as setting values 84 in the observation reference line information 80.

Figure 9:
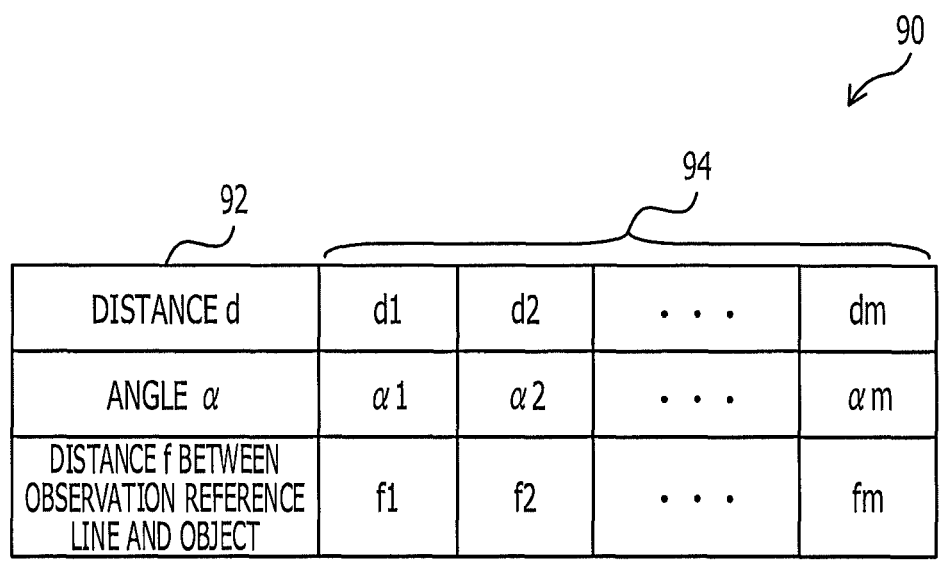
FIG. 9 is a view illustrating an example of a distance data according to the first embodiment.

FIG. 9 is a view illustrating an example of distance data 90. The distance data 90 is data indicating the distance between the object and the observation reference line. The distance data 90 includes, as items 92, the distance d, the angle α, the distance f between the observation reference line and the object. The calculated values 94 with respect to the distance d and the angle α are data calculated by the pairing processing unit 26 as described above, and the distance f is calculated by the recognition processing unit 28 using the following equation 1 and equation 2 based on the distance d and the angle α. As illustrated in FIG. 9, the distance f=f1, f2, . . . , fm, has been calculated with respect to the distance d=d1, d2, . . . , dm (m is an integer for one or more) and the angle α=α1, α2, . . . , αm.

For example, the distance f between the observation reference line 74 and the object may be calculated from the object information 75 and the observation reference line information 80 as follows. First, the location (d, α) of the object represented in a polar coordinates system with the radar 1 as an origin, is converted into a Cartesian coordinate system (x, y) with the radar 1 as an origin, by the following equation 1.

$$x=d\cos(\alpha), y=d\sin(\alpha) \quad \text{(equation 1)}$$

When using the equation 1, the distance f of the object is represented as the following equation 2.

$$f=x\sin\theta+y\cos\theta+P \quad \text{(equation 2)}$$

The recognition processing unit 28 sorts the distance data 90 in ascending order of an absolute value of the distance f between the observation reference line and the object, and defines the number of data capable of being output in ascending order of the distance f as target data for outputting.

FIG. 10 is a view illustrating an example of output data 95. The output data 95 is an example of target data for outputting from the radar 1. The output data 95 includes the distance d of the object, the velocity v of the object, the angle α, as items 96. The output values 97 are object information of each object calculated from the pairing processing unit 26 and include, for example, the distance d=d3, the velocity v=v3, the angle α=α3, the reception power e=e3. The output data 95 are object information corresponding to ms distance data sequentially from the distance data 90 having the smallest distance value among the distance data 90 sorted in an ascending order of the distance. The output data 95 is output to outside of the radar 1 by the external I/F 17.

Figure 11:
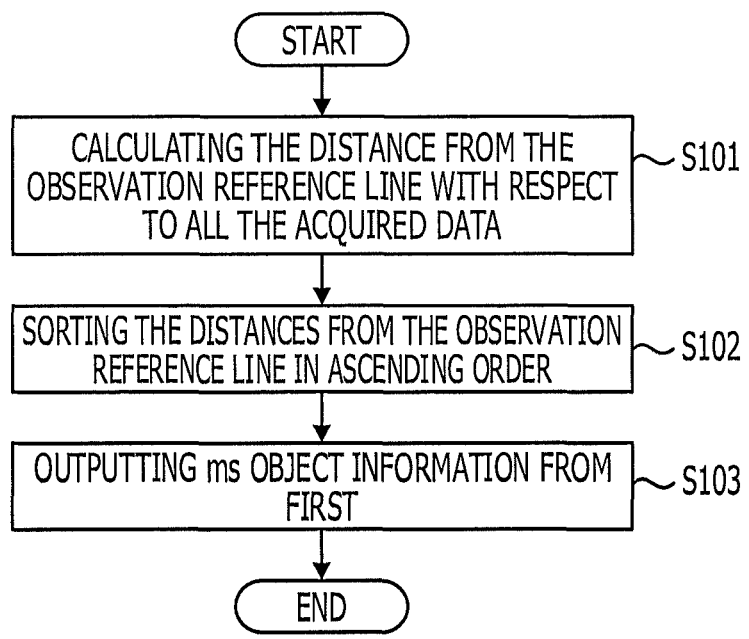
FIG. 11 is a flowchart illustrating an object detection process according to the first embodiment.

Next, an object detection process by the radar 1 will be described with reference to FIG. 11. FIG. 11 is a flowchart illustrating the operation of the radar 1. FIG. 11 illustrates a process after a process in which the radar 1 outputs a radio wave, receives a reflected wave, and generates a plurality of object information 75 has been completed is illustrated.

As illustrated in FIG. 11, the calculation unit 32 of the recognition processing unit 28 of the radar 1 calculates the distance from the observation reference line with respect to all of the object information 75 calculated from the pairing processing unit 26 using the above described equation 1 and equation 2 based on the observation reference line information 80 stored in advance. (S101). According to this process, for example, the distance data 90 is generated. The selection unit 34 of the recognition processing unit 28 sorts the distances f from the observation reference line calculated with respect to all of the object information 75 in ascending order (S102). The selection unit 34 of the recognition processing unit 28 selects a predetermined number ms (ms is a positive integer), which is preset in advance, of the object information 75 in ascending order of the distance f as the detection result. The output generation unit 36 generates output data based on the selected object information 75. The transmission processing unit 38 outputs the output data 95 as the detection result (S103). If the number of the object information 75 is smaller than ms, the transmission processing unit 38 outputs the output data 95 by performing a processing in which, for example, only a valid data is transmitted or the number of data in deficiency is embedded with empty data.

As described above in detail, in the radar 1 according to the first embodiment, the observation reference line which representatively and similarly indicates the location and the shape of the target area for detection of the radar 1 is set, and an angle formed by the observation reference line and the central orientation of the radar 1 and the distance between the observation reference line and the radar 1 are stored as the observation reference line information 80. The radar 1 calculates the distance between the object and the observation reference line from the detected object information 75 and the observation reference line information 80 based on the equation 1 and equation 2. Further, the radar 1 sorts the calculated distance in ascending order of the absolute value and outputs the object information of a predetermined number objects located at a distance as the detection information.

As described above, in the radar 1 according to the first embodiment, the observation reference line is set according to the shape and the location of the target area for detection, and the object information is output in ascending order of the distance between the radar 1 and the observation reference line among the detected objects. Accordingly, when the number of objects exceeding the processing capability (for example, the number exceeding ms) are detected, an object existing in the target area for detection may be detected first. Further, for example, it becomes possible to accurately detect the target object even when the radar is installed at a location where an object other than the target object is likely to be detected in the vicinity of the target area for detection.

As described above, the radar 1 may extract and output data having a higher priority using a relatively simple processing without increasing the processing load. In this case, for example, an image of the detection range is not needed. Further, since the observation reference line according to the target area for detection in an output range of the radar 1 is set, it is possible to obtain desired data according to the environment, which may not be obtained by merely sorting in an ascending or descending order of the output value of the radar 1 itself, such as, the distance of the object, the velocity of the object, the angle or the reception angle. In order to use the observation reference line, the observation reference line information indicating the shape and location of the observation reference line is set according to the environment in which the radar 1 is installed, but when the observation reference line is a straight line, the setting items are small with only two items of an angle and a distance of the observation reference line, and may be easily set. Further, at a final step of the process, in determining data to be output within a range amount permissible by system resources such as data processing capability, communication capacity, and processing period, the radar 1 is able to output data in an order from the data having the highest priority and detect the target object first.

Second Embodiment

Hereinafter, an object detection process by the radar according to a second embodiment will be described. In the second embodiment, the same components as those in the first embodiment are denoted by the same reference numerals as those in the first embodiment, and a redundant description thereof will be omitted. The second embodiment corresponds to a case where a plurality of straight lines are set as the observation reference line. The radar utilized in the second embodiment has a similar configuration as that in the first embodiment and thus, description thereof will be omitted.

Figure 12:
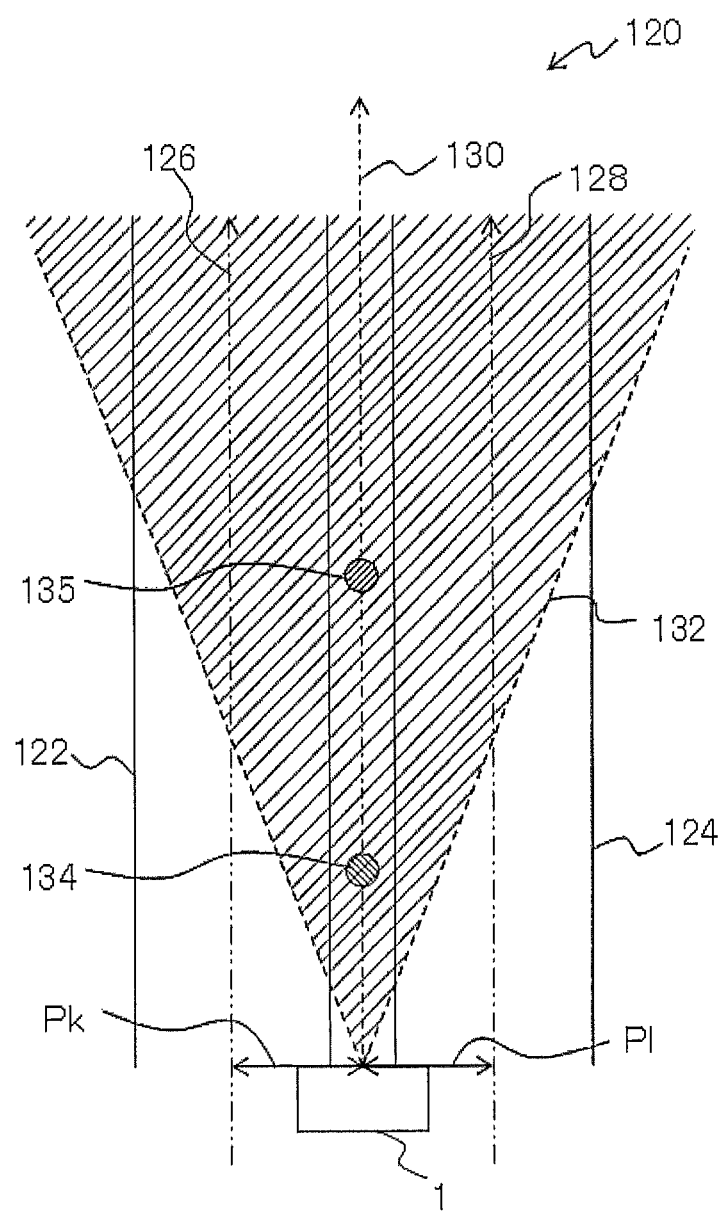
FIG. 12 is a view illustrating a setting example of an observation reference line according to a second embodiment.

FIG. 12 is a view illustrating a setting example of an observation reference line according to the second embodiment. As illustrated in FIG. 12, in the observation reference line setting example 120, the observation reference line 126 and the observation reference line 128 represented in two-dot chain line are set at the central portions of each of the road 122 and the road 124 adjacent to each other, respectively. In an environment illustrated in FIG. 12, exemplary structures 134, 135 are present between the road 122 and the road 124. In such an environment, when a single straight line between the road 122 and the road 124, such as for example, the straight line 130, is set as the observation reference line, the structures 134, 135 may be detected undesirably, and thus, two observation reference lines 126, 128 are set.

In the observation reference line setting example 120, when it is assumed that the central orientation of the radar 1 is a straight line 130, both of the observation reference lines 126, 128 are parallel to the straight line 130, and the angle ($\theta$) formed by the central orientation is 0 (zero). Further, the distance (P) between the observation reference line 126 and the radar 1 is Pk, and the distance (P) between the observation reference line 128 and the radar 1 is Pl. In this case, in the observation reference line information of the observation reference line 126, the angle ($\theta$) is 0 (zero) and the distance (P) is Pk, and in the observation reference line information of the observation reference line 128, the angle ($\theta$) is 0 (zero) and the distance (P) is Pl.

FIG. 13 is a view illustrating an example of general observation reference line information in a case where the number of observation reference line is plural. As illustrated in FIG. 13, the observation reference line information 140 includes, as items 142, n data each of which including a distance P between the radar and the observation reference line, and an angle $\theta$ between the central orientation of the radar and the observation reference line. And, as setting value 144, for example, the distance P=P1, . . . , Pn and the angle $\theta = \theta 1, \ldots, \theta n$ are set.

Figure 14:
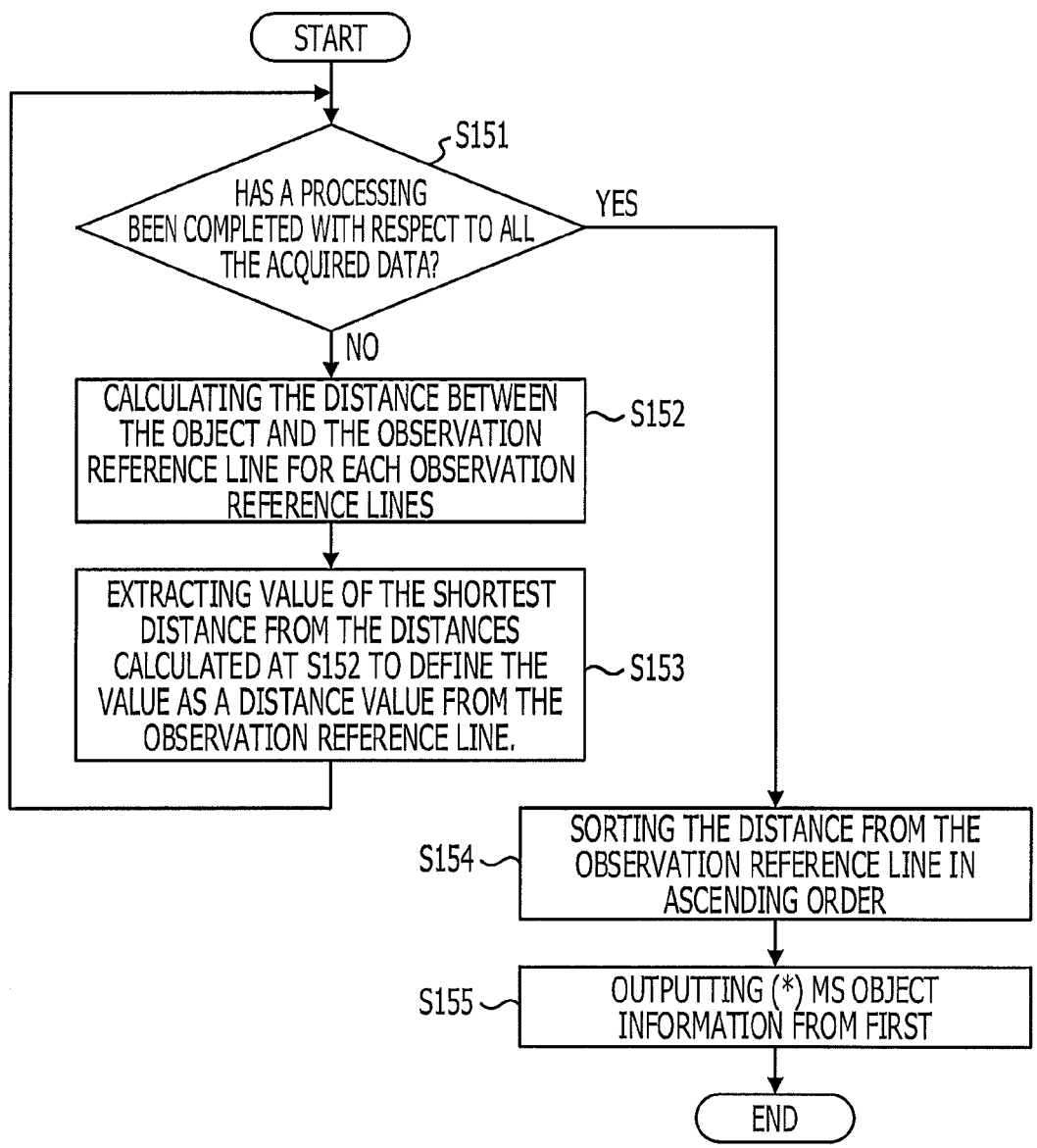
FIG. 14 is a flowchart illustrating an object detection process according to the second embodiment.

FIG. 14 is a flowchart illustrating the operation of the radar 1 in the second embodiment. In FIG. 14, a process after a processing in which the radar 1 outputs a radio wave, receives a reflected wave, and generates a plurality of object information 75 has been completed is illustrated.

As illustrated in FIG. 14, the calculation unit 32 of the recognition processing unit 28 determines whether the calculation of the distance between the object and the observation reference line has been completed with respect to all of the object information 75 relating to a plurality of acquired objects (S151). When it is determined that the calculation has not been completed ("NO" at step S151), the calculation unit 32 calculates the distance between the object and the observation reference line for each of a plurality of observation reference lines (S152). In this case, the calculation unit 32 calculates the distance f using the equation 1 and the equation 2 based on the object information 75 and the angle $\theta$ and the distance P of each observation reference line.

In the second embodiment, since the number of observation reference lines is plural, a plurality of distances may be calculated with respect to one object information 75 at S152. Therefore, the calculation unit 32 extracts the shortest distance from the distances calculated at S152 to extract a distance f between the object and the observation reference line with respect to one object information 75 (S153).

At S151, when the process has been completed for all of the object information 75 ("YES" at step S151), the selection unit 34 sorts the distance f in an ascending order (S154). The selection unit 34 selects the object information 75 corresponding to ms from the smallest value of the sorted distance f as the results to be outputted. The output generation unit 36 generates output data 95 based on the selected object information 75. The transmission processing unit 38 outputs the output data 95 including the selected ms object information 75 as the detection result.

As described above in detail, in the radar 1 according to the second embodiment, a plurality of the observation reference lines which similarly represent the location and shape of the target area for detection of the radar 1 are set. And an angle formed by the observation reference line and the central orientation of the radar 1, and the distance between the observation reference line and the radar 1 are stored as the observation reference line information 140. The radar 1 calculates each of the distances between the object and plurality of the observation reference lines based on the equation 1 and the equation 2 from the detected object information 75 and the observation reference line information 140. In a case where a plurality of distances f are calculated with respect to one object, a distance having the smallest distance among the plurality of calculated distances is defined as a distance f. Further, the radar 1 sorts the calculated distance f in ascending order of an absolute value and outputs the object information of a predetermined number of objects located at a distance f from the smallest as the detection information.

As described above, in the radar 1 according to the second embodiment, the plurality of observation reference lines are set according to the shape and location of the target area for detection, and the object information is output in ascending order of the distance between the radar 1 and the observation reference line. Therefore, in addition to the effect by the radar 1 according to the first embodiment, for example, in a case where there is a site in which many structures such as a central reservation exist in the road, there is an effect that the output data is selected based on the observation reference line set by avoiding the place in which many structures exist. Accordingly, in the radar 1 according to the second embodiment, an object other than the target object for detection is prevented from being detected and the target object on the road may be detected more efficiently.

Third Embodiment

Hereinafter, an object detection process by the radar according to a third embodiment will be described. In the third embodiment, the same components as those in the first or the second embodiment are denoted by the same reference numerals as those in the first or the second embodiment, and a redundant description thereof will be omitted. The third embodiment corresponds to a case where a line segment is set as the observation reference line. It is assumed that the line segment in the present embodiment includes the half-line having one end point and extending from the point indefinitely in one direction only. The radar utilized in the third embodiment has a similar configuration as that in the first or the second embodiment and thus, description thereof will be omitted.

Figure 15:
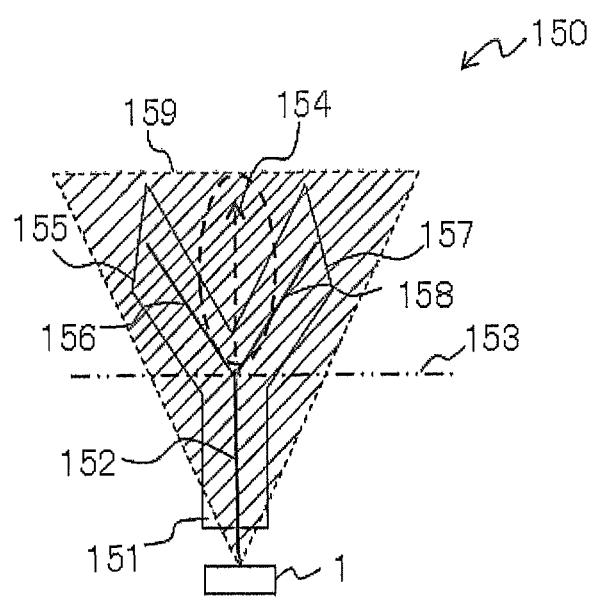
FIG. 15 is a view illustrating a setting example of an observation reference line according to a third embodiment.

FIG. 15 is a view illustrating an observation reference line setting example 150 according to the third embodiment. As illustrated in FIG. 15, in the observation reference line setting example 150, a Y-shaped road within the detection range 159 is defined as a target area for detection and a Y-shaped observation reference line is set. That is, an observation reference line 152, an observation reference line 156 and an observation reference line 158 are set to be corresponded to a road 151, a road 155 and a road 157, respectively. At least one end of these observation reference lines 152, 156, 158 are restricted, for example, as is known from the observation reference line 152 illustrated as not having an extension line 154. Here, a boundary line 153 is a straight line passing through one end of the observation reference line 152 and is perpendicular to the observation reference line 152. When the observation reference line is a line segment, the distance between the object and the observation reference line is calculated with respect to an area of the observation reference line 152 side of the boundary line 153 using the equation 1 and the equation 2. A foot of perpendicular cannot be drawn from the respective points within another area other than the area of the observation reference line, but, for example, the distance between the object and one end that is nearer to the observation reference line may be calculated and set as the distance between the object and the observation reference line. Further, when a plurality of distances f are calculated, the smallest value is defined as the distance f as in the second embodiment.

Figure 16:
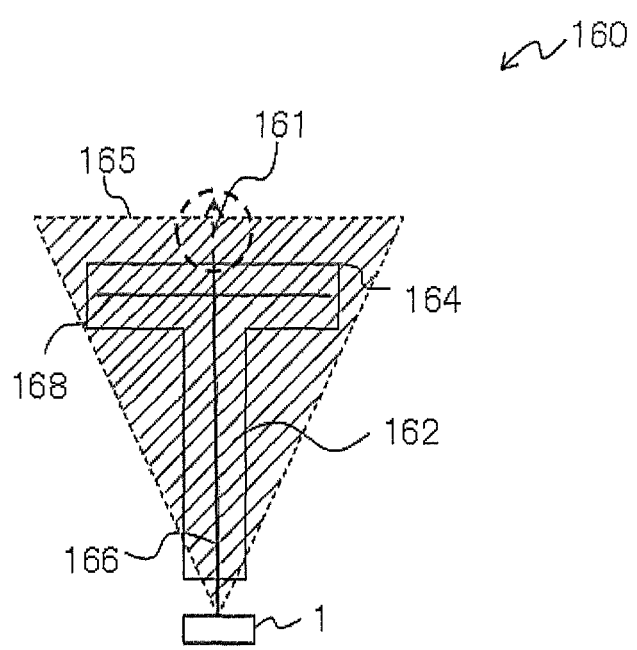
FIG. 16 is a view illustrating another setting example of an observation reference line according to the third embodiment.

FIG. 16 is a view illustrating another observation reference line setting example 160 according to the third embodiment. As illustrated in FIG. 16, in the observation reference line setting example 160, a T-shaped road within the detection range 165 is defines as a target area for detection and a T-shaped observation reference line is set. That is, an observation reference line 166 and an observation reference line 168 are set to be corresponded to a road 162 and a road 164, respectively. At least one end of the observation reference line 166 is restricted and of which extension line 161 does not exist. Also, in a case of the observation reference line setting example 160, the distance between the observation reference line and the object similarly as in the observation reference line setting example 150.

Figure 17:
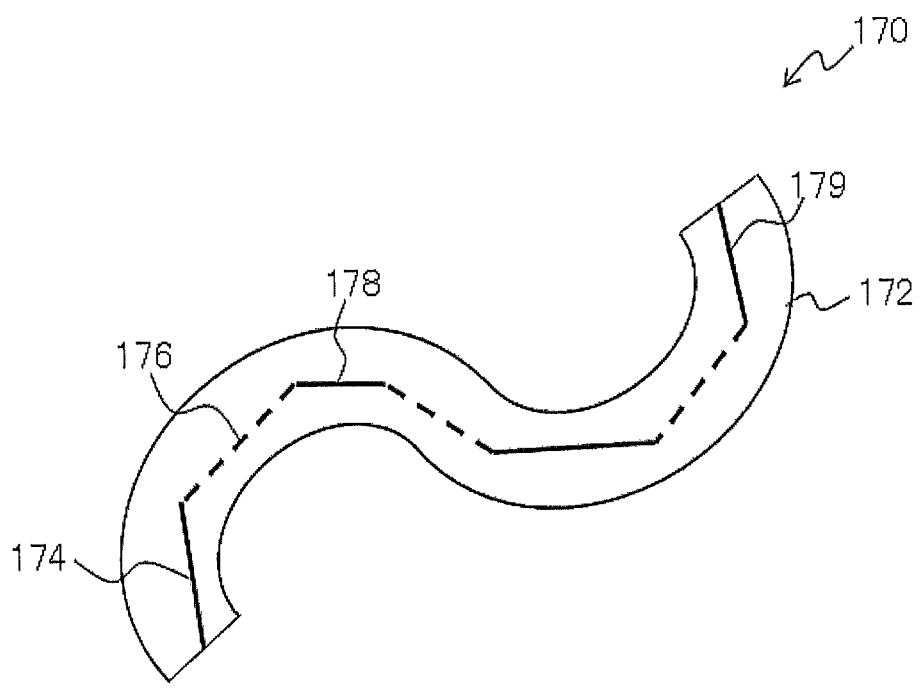
FIG. 17 is a view illustrating still another setting example of an observation reference line according to the third embodiment.

FIG. 17 is a view illustrating another observation reference line setting example 170 according to the third embodiment. As illustrated in FIG. 17, in the observation reference line setting example 170, a S-shaped road 172 is defined as a target area for detection. Accordingly, a plurality of observation reference lines 174, 176, 178, ..., 179 are set on the road 172. In this example, both ends of each of the observation reference line 176, and the observation reference line 178 are restricted except for the observation reference lines 174, 179 located at end portions. Also in the observation reference line setting example 170, when the foot of perpendicular is able to be drawn from the location of the object to the observation reference line as in the observation reference line setting examples 150, 160, the distance between the observation reference line and the object is calculated.

Figure 18:
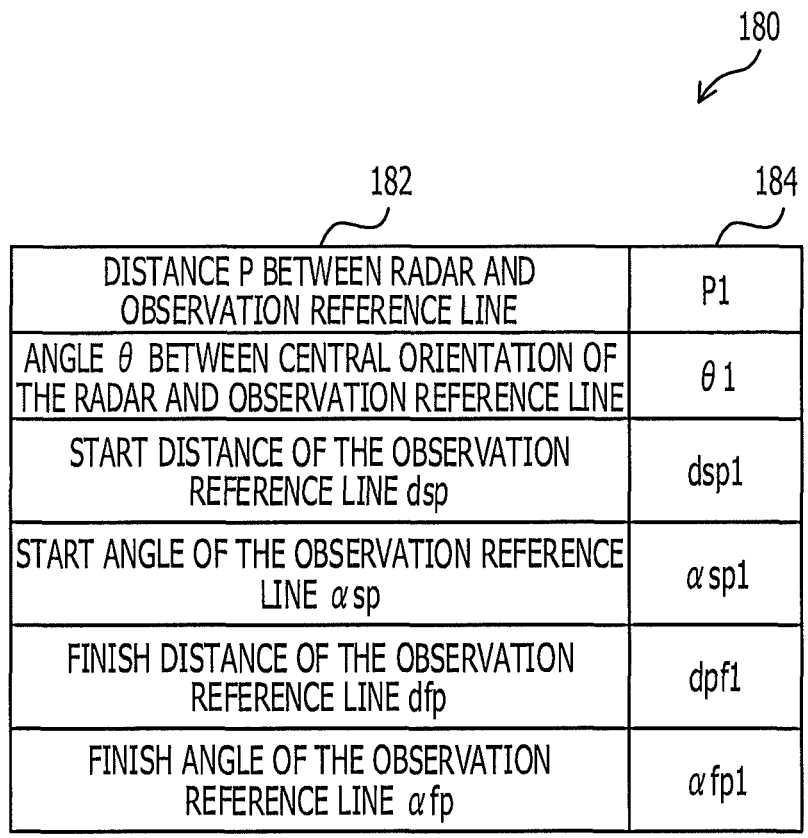
FIG. 18 is a view illustrating a setting example of observation reference line information according to the third embodiment.

FIG. 18 is a view illustrating an example of the observation reference line information in a case where the observation reference line is a line segment. In the observation reference line information 180, a case where the number of line segment is exemplified. As illustrated in FIG. 18, the observation reference line information 180 includes, as item 182, distance P between the radar 1 and the observation reference line, an angle θ formed by the central orientation of the radar 1 and the observation reference line 74, a start distance of the observation reference line dsp, a start angle αsp, a finish distance of the observation reference line dfp, and a finish angle αfp. The start distance of the observation reference line dsp is the distance of one end (also referred to as start point) of the observation reference line from the radar 1. The start angle αsp is an angle formed by the observation reference line and the central orientation which corresponds to a direction from the radar 1 to one end of the observation reference line. The finish distance of the observation reference line dfp is the distance of the other end (also referred to as finish point) of the observation reference line from the radar 1. The finish angle αfp is an angle formed by the observation reference line and the central orientation which corresponds to the direction from the radar 1 to the other end of the observation reference line.

The observation reference line information 180 includes, as setting value 184, for example, the distance P=P1, the angle θ=θ1, the start distance dsp=dsp1, the start angle αsp=αsp1, the finish distance dfp=dfp1, the finish angle αfp=αfp1. Further, in a case where the observation reference line is half-line, the finish distance dfp and the finish angle αfp are not set.

Figure 19:
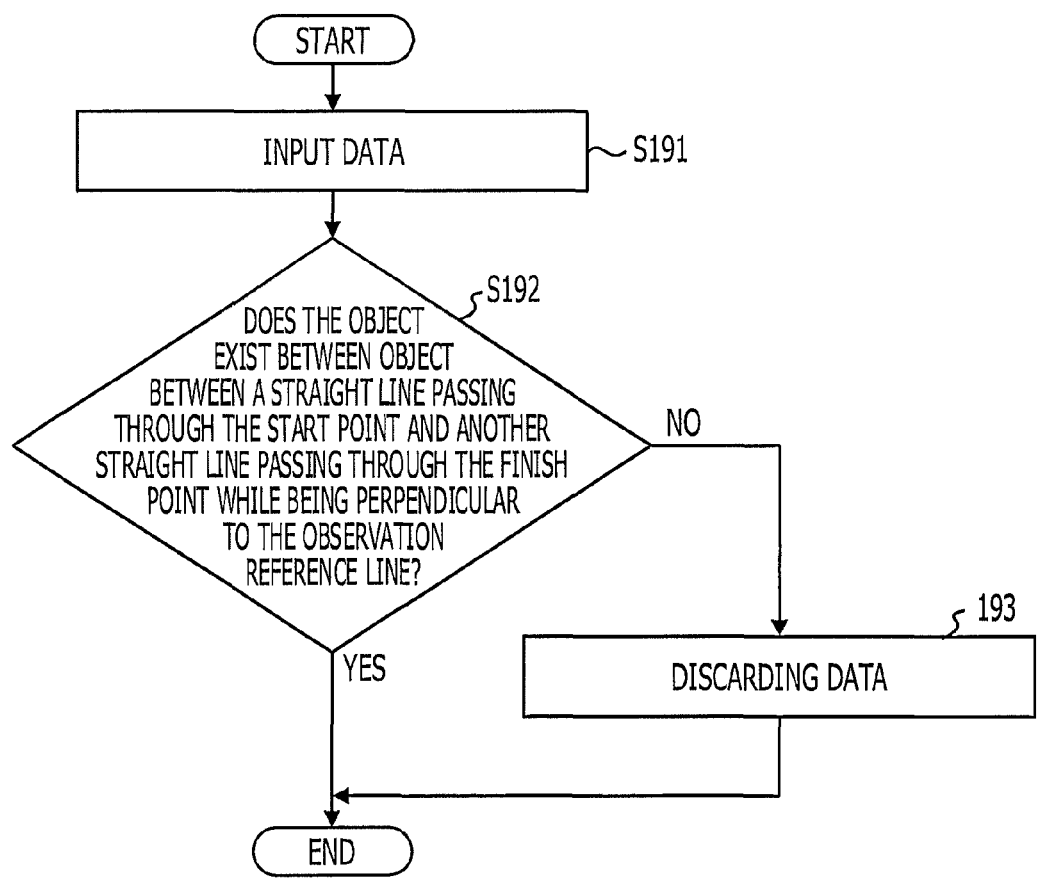
FIG. 19 is a flowchart illustrating an object detection process according to the third embodiment.

FIG. 19 is a flowchart illustrating the operation of the radar 1 according to the third embodiment. In FIG. 19, a process after a process in which the radar 1 outputs a radio wave, receives a reflected wave, and generates a plurality of object information 75 has been completed, is illustrated.

As illustrated in FIG. 19, the object information 75 from the pairing processing unit 26 is input to the calculation unit 32 of the recognition processing unit 28 (S191). The calculation unit 32 determines whether the object exists between a straight line which passes through the start point while being perpendicular to the observation reference line and a straight line which passes through the finish point while being perpendicular to the observation reference line, based on, for example, the object information 75 and the observation reference line information 180 (S192). Further, as described with reference to FIG. 15, when the observation reference line is half-line, the calculation unit 32 determines whether the object exists in the observation reference line side of the straight line which passes through the finish point while being perpendicular to the observation reference line.

When the determination result at S192 is "YES", the calculation unit 32 calculates the distance between the object and the observation reference line using the equation 1 and the equation 2 according to the process of FIG. 11. In this case, when a plurality of observation reference lines are present, the calculation unit 32 calculates the distance between the object and the observation reference line using the equation 1 and the equation 2, according to the process of FIG. 14. When the determination result at S192 is "NO", since the foot of perpendicular may not be drawn from a location of the object to the observation reference line, the calculation unit 32 discards data (S193). Further, the process of FIG. 19 is repeated for all of the objects. As described above, when the foot of perpendicular may not be drawn from the object to the observation reference line, the distance to an end portion closer to the object may be calculated.

FIG. 20 is a view illustrating a setting example of observation reference line information 200. The setting example of an observation reference line 200 illustrates an example of the observation reference line information in a case where a plurality of line segments are set as the observation reference line. The observation reference line information 200, as item 202, includes, for example, a plurality of n data each of which is constituted with distance P between the radar 1 and the observation reference line, an angle θ formed by the central orientation of the radar 1 and the observation reference line 74, a start distance of the observation reference line dsp, a start angle αsp, a finish distance of the observation reference line dfp, and a finish angle αfp. Further, in the observation reference line information 200, as setting value 204, for example, the distance P=P1, . . . , Pn, the angle θ=θ1, . . . , θn, and the start distance dsp=dsp1, . . . , dspn are set. Further, each start angle αsp=α sp1, . . . , αspn, each finish distance of the observation reference line dfp=dsp1, . . . , dspn, and each finish angle αfp=α fp1, . . . , αfpn are set, respectively. Further, when the observation reference line is half-line, the finish distance dfp and the finish angle αfp are not set.

As in the example of the observation reference line information 200, in a case where there are a plurality of line segments, the distances between the objects and the observation reference lines are calculated based on the observation reference line information 200 of each line segment and the object information 75 of each object, the distances are sorted in ascending order of a distance f, which is the nearest to the object, and the detection result are output in ascending order of the distance f.

As described above, in the radar 1 according to the third embodiment, the observation reference line is set, for example, half-line or line segment according to the road, and object information are output in ascending order of the distance f between the observation reference line and the object. Therefore, in addition to the effect obtained by the radar 1 according to the first embodiment, for example, even when a road having a shape other than a simple straight line is a target area for detection, it becomes possible to set the observation reference line according to the shape and the location of the road. Accordingly, it becomes possible to detect the target object on the road more efficiently.

Fourth Embodiment

Hereinafter, an object detection process by the radar according to a fourth embodiment will be described. In the fourth embodiment, the same components as those in the first, the second and the third embodiments are denoted by the same reference numerals as those in the first, the second and the third embodiments, and a redundant description thereof will be omitted. The fourth embodiment corresponds to a case where a curved line is set as the observation reference line. The observation reference line in the present embodiment represents a target area for detection by being approximated with an arc. The radar utilized in the fourth embodiment has a similar configuration as that in the first, the second and the third embodiments and thus, description thereof will be omitted.

Figure 21:
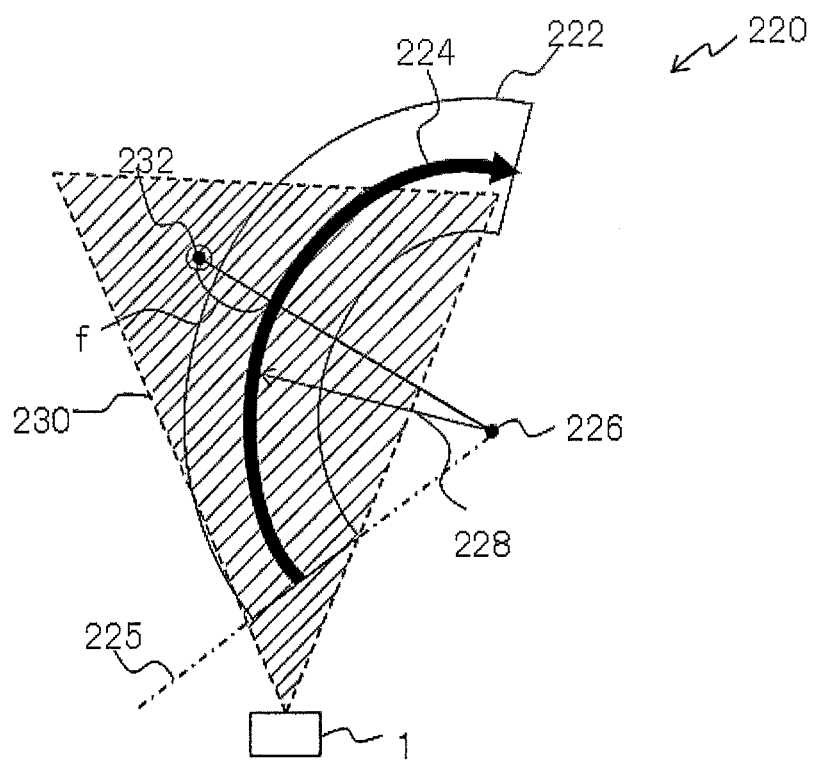
FIG. 21 is a view illustrating a setting example of an observation reference line according to a fourth embodiment.

FIG. 21 is a view illustrating an observation reference line setting example 220 according to a fourth embodiment. As illustrated in FIG. 21, in the fourth embodiment, the target area for detection is a road 222, and the road 222 is approximated with an observation reference line 224 formed in an arc. In this case, the center and the radius of the observation reference line 224 are a center 226 and a radius 228, respectively. Further, one end of the observation reference line 224 is restricted. A boundary line 225 is a straight line passing through the center 226 and one end of the observation reference line 224.

In a case of the observation reference line setting example 220, it is possible to draw the foot of perpendicular from a location of the object existing at the observation reference line 224 side of a boundary line 225 to the observation reference line 224. For example, the distance f between an object 232 and the observation reference line 224 corresponds to the distance resulted by subtracting a radius 228 from the distance between the center 226 and the object 232. Also in this case, the distance from an object existing at a side opposing to the observation reference line 224 of the boundary line 225 may be calculated as the distance between the object and an end portion nearer to observation reference line 224.

As described above, in the radar 1 according to the fourth embodiment, the observation reference line is set, for example, to be approximated with an arc according to the road, the distance between the object and the observation reference line is calculated based on the radius and the center of the arc, and object information is output in ascending order of the calculated distance. Therefore, in addition to the effect obtained by the radar 1 according to the first embodiment, for example, even when the road having a curved shape is a target area for detection, it becomes possible to set the observation reference line according to the shape and the location of the road. Accordingly, it becomes possible to detect the target object on the road more efficiently.

Further, the present disclosure is not limited to the embodiments described above, but may adopt various configurations and embodiments without departing from a gist of the subject matters of the present disclosure. For example, the observation reference line setting methods according to the first embodiment to the fourth embodiment may be arbitrarily combined to be used. In a case where at least one end of the observation reference line is present, with respect to the object located within an area from which the foot of perpendicular may not be drawn to the observation reference line, for example, the distance between the object and an end portion nearer to observation reference line may be calculated. Further, the coordinate axes or origins set in the first to the fourth embodiments are not limited to the matters described above.

Further, the transmitting antenna unit 3 and the RF unit 5 constitute an example of a radio wave output unit, and the receiving antenna unit 4 and the RF unit 5 constitute an example of a radio wave receiving unit. The FFT processing unit 24 and the pairing processing unit 26 constitute an example of an object information generation unit, and the external I/F unit 17 and the transmission processing unit 38 constitute an example of an outputting unit. The central orientation is an example of a reference orientation and the center of the radar 1 is an example of a reference point. The distance f is an example of a first distance and the distance d is an example of a second distance.

Figure 22:
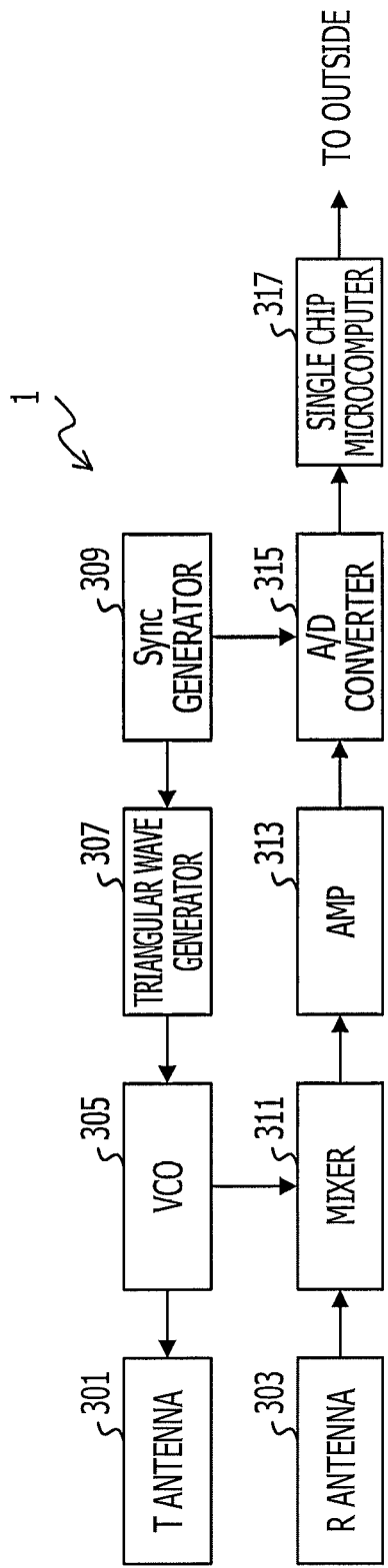
FIG. 22 is a view illustrating an example of a hardware configuration of a radar.

Hereinafter, an example of the hardware configuration of the radar 1 according to the first, the second, the third and the fourth embodiments will be described with reference to FIG. 22. FIG. 22 is a view illustrating an example of the hardware configuration of the radar 1.

As illustrated in FIG. 22, the radar 1 includes a Transmitting (T) antenna 301, a Receiving (R) antenna 303, and a Voltage Controlled Oscillator (VCO) 305. Further, the radar 1 includes a triangular wave generator 307, a synchronizing signal (Sync) generator 309, a mixer 311, an amplifier 313, an A/D converter 315, and a single chip microcomputer 317.

The T antenna 301 is an antenna which transmits the radio wave for detecting an object. The T antenna 301 is corresponding to the transmitting antenna unit 3. The R antenna 303 is an antenna which receives the radio wave. The R antenna 303 is corresponding to the receiving antenna unit 4.

The VCO 305 is a voltage controlled oscillation circuit and generates, for example, a transmission signal subjected to a frequency conversion based on the triangular signal generated from the triangular wave generator 307 and outputs the transmission signal to the T antenna 301. The triangular wave generator 307 is a circuit which generates a converted signal having a triangular waveform and outputs the converted signal to the VCO 305. The Sync generator 309 is a circuit which generates a synchronizing signal. The mixer 311 is a circuit which mixes the transmitted signal from the T antenna 301 and the received signal by the R antenna 303. The amplifier 313 is a circuit which amplifies a signal component based on the reflected wave from the object based on the output signal of the mixer 311. The VCO 305, the triangular wave generator 307, the Sync generator 309, the mixer 311, and the amplifier 313 are collectively corresponding to the RF unit 5.

The A/D converter 315 is a circuit which converts an analog signal output from the amplifier 313 into a digital signal based on the synchronizing signal from the Sync generator 309. The A/D converter 315 is corresponding to the analog circuit unit 7.

The single chip microcomputer 317 is an operational processing circuit for controlling the radar 1, and is corresponding to the radar processing unit 9 and the external I/F 17. The single chip microcomputer 317 performs an operational processing to output information such as the location and the velocity of the detected object to the outside. Further, the external I/F 17 may be installed in a separate unit.

Accordingly, according to the aspects described above, there is provided an object detection apparatus and a method capable of selecting and outputting desired information among information of the detected objects using a relatively simple operational processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An object detection apparatus comprising:
a transmitter configured to output a radio wave;
a receiver configured to receive a reflected wave of the radio wave; and
a processor configured to:
generate a plurality of object information each indicating a location of each of a plurality of objects with respect to a predetermined reference point based on the radio wave and the reflected wave,
calculate a first distance between an observation reference line which represents a shape and a location of a target area for detection preset depending on a target object for detection, and each of the plurality of objects, based on the observation reference line information stored in advance indicating a shape and a location of the observation reference line and the object information,
select a predetermined number or less of the object information in ascending order of the first distance among the plurality of the object information as the object information to be output, and
output the predetermined number or less of the selected object information.

2. The object detection apparatus according to claim 1, wherein the observation reference line is at least a straight line,
the observation reference line information includes a first angle formed by the observation reference line and a reference orientation defined based on a direction along which the radio wave is output and a second distance between the observation reference line and the reference point, and
the processor calculates the first distance according to each of the plurality of objects, based on the object information, the first angle and the second distance.

3. The object detection apparatus according to claim 1, wherein the observation reference line is at least a segment,
the observation reference line information includes a first angle formed by the observation reference line and a reference orientation defined based on a direction along which the radio wave is output, a second distance between the observation reference line and the reference point, and locations of both end points of the line segment, and
the processor calculates the first distance according to each of the plurality of objects, based on the object information, the first angle, the second distance and locations of both end points.

4. The object detection apparatus according to claim 1, wherein the observation reference line is at least an arc,
the observation reference line information includes a center position and a radius of the arc, and
the processor calculates the first distance according to each of the plurality of objects, based on the center position and radius of the arc.

5. The object detection apparatus according to claim 1, wherein the observation reference line is set based on the shape of a road.

6. A non-transitory computer-readable storage medium storing a computer executable program that, when executed, causes a computer to perform an object detection method comprising:
generating a plurality of object information each indicating a location of each of a plurality of objects with respect to a predetermined reference point based on an output radio wave and a reflected radio wave;
calculating a first distance between an observation reference line which represents a shape and a location of a target area for detection preset depending on a target object for detection, and each of the plurality of objects, based on the observation reference line information stored in advance indicating a shape and a location of the observation reference line and the object information;

selecting a predetermined number or less of the object information in ascending order of the first distance among the plurality of the object information as the object information to be output; and outputting the predetermined number or less of the selected object information.

7. The non-transitory computer-readable storage medium according to claim 6, wherein the observation reference line is at least a straight line, the observation reference line information includes a first angle formed by the observation reference line and a reference orientation defined based on a direction along which the radio wave is output and a second distance between the observation reference line and the reference point, and the first distance according to each of the plurality of objects is calculated based on the object information, the first angle and the second distance.

8. The non-transitory computer-readable storage medium according to claim 6, wherein the observation reference line is at least a segment, the observation reference line information includes a first angle formed by the observation reference line and a reference orientation defined based on a direction along which the radio wave is output, a second distance between the observation reference line and the reference point, and locations of both end points of the line segment, and the first distance according to each of the plurality of objects is calculated based on the object information, the first angle, the second distance and locations of both end points.

9. The non-transitory computer-readable storage medium according to claim 6, wherein the observation reference line is at least an arc, the observation reference line information includes a center position and a radius of the arc, and the first distance according to each of the plurality of objects is calculated based on the center position and radius of the arc.

10. The non-transitory computer-readable storage medium according to claim 6, wherein the observation reference line is set based on the shape of a road.

11. The non-transitory computer-readable storage medium according to claim 6, wherein the computer executable program that, when executed, causes the computer to perform the object detection method further comprising:

outputting the radio wave;

receiving the reflected wave of the radio wave; and generating the object information based on the radio wave and the reflected wave.

12. An object detection method comprising:

outputting a radio wave;

receiving a reflected wave of the radio wave;

generating a plurality of object information each indicating a location of each of a plurality of objects with respect to a predetermined reference point based on the radio wave and the reflected wave;

calculating, by a processor, a first distance between an observation reference line which represents a shape and a location of a target area for detection preset depending on a target object for detection, and each of the plurality of objects, based on the observation reference line information stored in advance indicating a shape and a location of the observation reference line and the object information;

selecting a predetermined number or less of the object information in ascending order of the first distance among the plurality of the object information as the object information to be output; and outputting the predetermined number or less of the selected object information.

* * * * *